(12) United States Patent
Takasaki

(10) Patent No.: US 11,292,727 B2
(45) Date of Patent: Apr. 5, 2022

(54) SURFACE-MODIFIED METAL COMPOUND PARTICLES, AND METHOD FOR PRODUCING SURFACE-MODIFIED METAL COMPOUND PARTICLES

(71) Applicant: DAIICHI KIGENSO KAGAKU KOGYO CO., LTD., Osaka (JP)

(72) Inventor: Fumiyuki Takasaki, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 16/763,533

(22) PCT Filed: Jan. 10, 2019

(86) PCT No.: PCT/JP2019/000449
§ 371 (c)(1),
(2) Date: May 12, 2020

(87) PCT Pub. No.: WO2019/146409
PCT Pub. Date: Aug. 1, 2019

(65) Prior Publication Data
US 2020/0362175 A1    Nov. 19, 2020

(30) Foreign Application Priority Data
Jan. 24, 2018   (JP) .............................. JP2018-009359

(51) Int. Cl.
| C09C 3/08 | (2006.01) |
| C09C 1/00 | (2006.01) |
| C01F 17/235 | (2020.01) |
| C01G 25/02 | (2006.01) |

(52) U.S. Cl.
CPC ............ *C01F 17/235* (2020.01); *C01G 25/02* (2013.01); *C09C 1/00* (2013.01); *C09C 3/08* (2013.01)

(58) Field of Classification Search
None
See application file for complete search history.

(56) References Cited

FOREIGN PATENT DOCUMENTS

| JP | 2006-082994 A | 3/2006 |
| JP | 2007-254257 A | 10/2007 |
| JP | 2008-031023 A | 2/2008 |
| JP | 2011-105553 A | 6/2011 |

(Continued)

OTHER PUBLICATIONS

Notification of Transmittal of Translation of the International Preliminary Report on Patentability and Translation of Written Opinion of the International Searching Authority; PCT/JP2019/000449; dated Aug. 6, 2020.

(Continued)

*Primary Examiner* — Alexandre F Ferre
(74) *Attorney, Agent, or Firm* — Studebaker & Brackett PC

(57) ABSTRACT

These surface-modified metal compound particles have metal compound particles the surfaces of which are modified by: at least one first carboxylic acid selected from the group consisting of a methacrylic acid, an acrylic acid, and a propionic acid; and at least one second carboxylic acid selected from the group consisting of a C6-C16 fatty acid and a C7-C32 monovalent carboxylic acid having at least one benzene ring, wherein at least a portion of the first carboxylic acid is a carboxylic acid type in which a hydrogen atom of the carboxy group is not dissociated as an ion.

6 Claims, 1 Drawing Sheet

(56) References Cited

FOREIGN PATENT DOCUMENTS

JP  2013-216858 A  10/2013

OTHER PUBLICATIONS

An Office Action; "Notification of Reasons for Refusal," issued by the Japanese Patent Office dated Aug. 1, 2019, which corresponds to Japanese Patent Application No. 2019-532157; with English language translation.
International Search Report issued in PCT/JP2019/000449; dated Mar. 5, 2019.
The extended European search report issued by the European Patent Office dated Sep. 14, 2021, which corresponds to European Patent Application No. 19743937.5-1105 and is related to U.S. Appl. No. 16/763,533.
An Office Action mailed by the Korean Intellectual Property Office dated Dec. 20, 2021, which corresponds to Korean Patent Application No. 10-2020-7011976 and is related to U.S. Appl. No. 16/763,533; with English language translation.

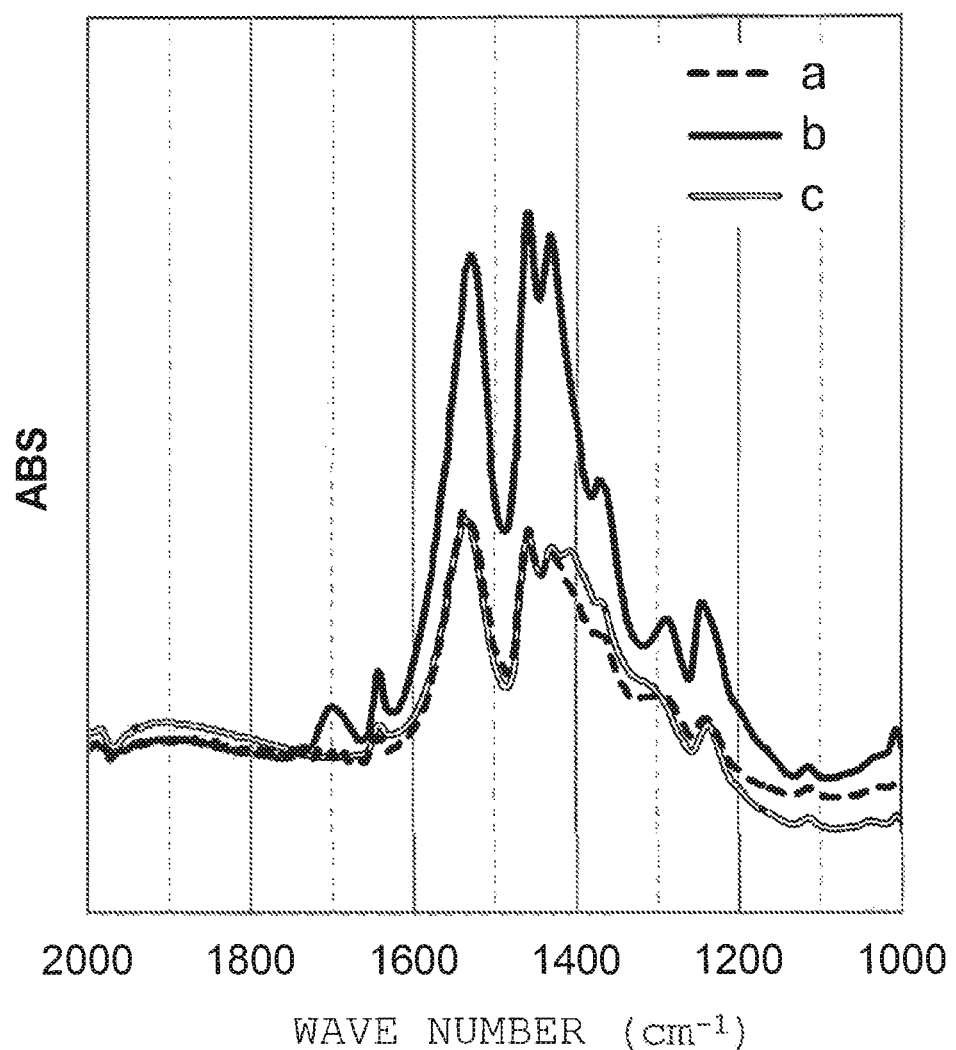

SURFACE-MODIFIED METAL COMPOUND PARTICLES, AND METHOD FOR PRODUCING SURFACE-MODIFIED METAL COMPOUND PARTICLES

TECHNICAL FIELD

The present invention relates to surface-modified metal compound particles and a method for producing surface-modified metal compound particles.

BACKGROUND ART

Metal compound particles such as metal oxide particles and metal hydroxide particles are widely used in fields of refractories, ceramics, optical materials, automobile exhaust gas catalysts and the like. In these applications, the metal compound particles are often used with being mixed with other materials through a solvent. Thus, metal compound particles that can be easily dispersed in an appropriate solvent according to the application are required. Among them, the latent demand for metal compound particles that can be dispersed in a nonpolar solvent such as toluene, hexane, and cyclohexane is great.

Conventionally, surface-modifying metal compound particles with a surfactant such as a carboxylic acid to disperse the metal compound particles in an organic solvent are known.

PRIOR ART DOCUMENTS

Patent Documents

Patent Document 1: JP-A-2008-31023
Patent Document 2: JP-A-2007-254257
Patent Document 3: JP-A-2006-82994

SUMMARY OF THE INVENTION

Problems to be Solved by the Invention

However, the method for controlling the adsorption state of the surfactant to achieve the good dispersibility in the organic solvent has not been conventionally disclosed. That is, metal compound particles surface-modified with a carboxylic acid that are focused on the dispersibility in a versatilely used nonpolar solvent such as toluene, hexane, and cyclohexane have not been conventionally discovered.

The present invention has been made in view of the problems. An object of the present invention is to provide surface-modified metal compound particles having good dispersibility in a nonpolar solvent such as toluene, hexane, and cyclohexane, and a method for producing the surface-modified metal compound particles.

Means for Solving the Problems

The present inventor has conducted intensive studies on surface-modified metal compound particles. As a result, the present inventor has found that, by employing the following constitution, the good dispersibility of the surface-modified metal compound particles in a nonpolar solvent can be achieved, thereby completing the present invention.

That is, the surface-modified metal compound particles according to the present invention are surface-modified metal compound particles including: metal compound particles that are surface-modified with at least one first carboxylic acid selected from the group consisting of methacrylic acid, acrylic acid, and propionic acid, and at least one second carboxylic acid selected from the group consisting of a fatty acid having 6 to 16 carbon atoms and a monovalent carboxylic acid having at least one benzene ring and 7 to 32 carbon atoms, wherein at least a portion of the first carboxylic acid is a carboxylic acid type in which a hydrogen atom of a carboxy group is not dissociated as an ion.

The second carboxylic acid (a fatty acid having 6 to 16 carbon atoms and a monovalent carboxylic acid having at least one benzene ring and 7 to 32 carbon atoms) includes a carboxy group (—COOH), which is a hydrophilic group, and a lipophilic group, which accounts for a relatively large portion of the second carboxylic acid. In most of the second carboxylic acid of the surface-modified metal compound particles, a carboxy group faces to the surface of the metal compound particles, and a lipophilic group faces outward.

According to the constitution, the metal compound particles are surface-modified with the second carboxylic acid and covered with a lipophilic group that accounts for a relatively large portion of the second carboxylic acid, and thus has good dispersibility in a nonpolar solvent such as toluene, hexane, and cyclohexane.

To simply improve the dispersibility in the nonpolar solvent, the content of the second carboxylic acid can be increased. This is because when the content of the second carboxylic; acid is increased, the metal compound particles can be completely surrounded.

However, because the lipophilic group moiety of the second carboxylic acid has a relatively high molecular weight, increasing the content thereof affects the physical properties of the obtained surface-modified metal compound particles.

Such a change in physical properties may not be accepted depending on the application. Specifically, for example, when the content of the second carboxylic acid is increased, the viscosity of the solvent dispersion of the obtained surface-modified metal compound particles is increased.

On the other hand, when the content of the second carboxylic acid is decreased to reduce the influence on the physical properties of the obtained surface-modified metal compound particles, the dispersibility in a nonpolar solvent becomes poor. The present inventor surmises that this is because (1) the density of the lipophilic group surrounding the metal compound particles is low overall, and in addition, (2) one lipophilic group and another lipophilic group adhere to each other due to the interaction, and the surface of the metal compound particles is largely divided into a portion covered with a lipophilic moiety (a portion where multiple lipophilic groups adhere each other) and a portion uncovered.

Thus, the present inventor has found that even when the content of the second carboxylic acid is decreased, by inclusion of the first carboxylic acid in a carboxylic acid type, the good dispersibility in a nonpolar solvent can be achieved without significantly affecting the physical properties of the surface-modified metal compound particles.

The present inventor surmises that this is because, by inclusion of the first carboxylic acid in a carboxylic acid type, the first carboxylic acid enters between the lipophilic groups of second carboxylic acids and the adhesion between one lipophilic group and another lipophilic group of second carboxylic acids can be suppressed. That is, the present inventor surmises that even when the density of the lipophilic group of the second carboxylic acid is relatively low overall, the lipophilic group uniformly surrounds the metal compound particles, and thus the good dispersibility in the nonpolar solvent can be achieved. Further, the present inventor surmises that the lipophilic group of the first carboxylic acid that has entered between the lipophilic groups of second carboxylic acids contributes to the good dispersibility in a nonpolar solvent.

The fact that the first carboxylic acid is present in a carboxylic acid type is clear from Examples.

In the constitution, the second carboxylic acid is preferably a carboxylate type in which a hydrogen atom of a carboxy group is dissociated as an ion.

When the second carboxylic acid is a carboxylate type (—COO⁻) in which a hydrogen atom of a carboxy group is dissociated as an ion, the second carboxylic acid can be suitably adsorbed or bonded to the surface of the metal compound particles.

In the constitution, a metal constituting the metal compound particles is preferably at least one selected from the group consisting of zirconium and rare earths.

When the metal constituting the metal compound particles is at least one selected from the group consisting of zirconium and rare earths, the industrial use value in the fields of catalysts, electronic components, fine ceramics, solid oxide fuel cells, optics and the like is high.

In the constitution, the metal compound constituting the metal compound particles is preferably a metal oxide.

When the metal compound constituting the metal compound particles is a metal oxide, the industrial use value in the fields of catalysts, electronic components, fine ceramics, solid oxide fuel cells, optics and the like is higher.

The method for producing surface-modified metal compound particles according to the present invention is the method for producing surface-modified metal compound particles described above, and includes a step A of adding at least one second carboxylic acid selected from the group consisting of a fatty acid having 6 to 16 carbon atoms and a monovalent carboxylic acid having at least one benzene ring and 7 to 32 carbon atoms to metal compound particles having positive zeta potential and being dispersed in a water solvent; a step B of drying a product obtained through the step A; and a step C of adding at least one first carboxylic acid selected from the group consisting of methacrylic acid, acrylic acid, and propionic acid after the step B.

The surface-modified metal compound particles described above are obtained through the step A, the step B, and the step C. That is, according to the constitution, the surface-modified metal compound particles having good dispersibility in a nonpolar solvent can be obtained without significantly affecting the physical properties of the surface-modified metal compound particles.

In the constitution, a metal compound concentration of a product after the step B is preferably 80 wt % or less in terms of oxide.

When the metal compound concentration of a product after the step B is 80 wt % or less in terms of oxide, at least a small amount of water is contained. The present inventor surmises that when the metal compound concentration of a product after the step B is controlled to 80 wt % or less in terms of oxide, water (water molecule) can be interposed between lipophilic groups of multiple second carboxylic acids. That is, the present inventor surmises that the lipophilic groups of second carboxylic acids are less likely to adhere each other. The present inventor surmises that when a first carboxylic acid is added in a state where water is interposed between the lipophilic groups of multiple second carboxylic acids, the first carboxylic acid can suitably enter between the lipophilic groups of second carboxylic acids, and the adhesion between one lipophilic group and another lipophilic group of second carboxylic acids can be suppressed.

Thus, the present inventor surmises that even when the density of the lipophilic group of the second carboxylic acid is relatively low overall, the lipophilic group uniformly surrounds the metal compound particles, and thus the good dispersibility in the nonpolar solvent can be achieved. Further, the present inventor surmises that the lipophilic group of the first carboxylic acid that has entered between the lipophilic groups of second carboxylic acids contributes to the good dispersibility in a nonpolar solvent. Although the mechanism is unproved, the fact that when the metal compound concentration of a product after the step B is 80 wt % or less in terms of oxide, good dispersibility in a nonpolar solvent is achieved is clear from Examples.

Effect of the Invention

According to the present invention, the good dispersibility of surface-modified metal compound particles in a nonpolar solvent can be achieved.

BRIEF DESCRIPTION OF THE DRAWINGS

The FIGURE is an infrared absorption spectrum for explaining a method for proving that a first carboxylic acid is present in a carboxylic acid type in surface-modified metal compound particles.

MODE FOR CARRYING OUT THE INVENTION

Hereinafter, embodiments of the present invention will be described. However, the present invention is not limited to only these embodiments.

<Surface-Modified Metal Compound Particles>

The surface-modified metal compound particles according to the present embodiment are surface-modified metal compound particles including: metal compound particles that are surface-modified with at least one first carboxylic acid selected from the group consisting of methacrylic acid, acrylic acid, and propionic acid, and at least one second carboxylic acid selected from the group consisting of a fatty acid having 6 to 16 carbon atoms and a monovalent carboxylic acid having at least one benzene ring and 7 to 32 carbon atoms, wherein at least a portion of the first carboxylic acid is a carboxylic acid type in which a hydrogen atom of a carboxy group is not dissociated as an ion.

The second carboxylic acid (a fatty acid having 6 to 16 carbon atoms and a monovalent carboxylic acid having at least one benzene ring and 7 to 32 carbon atoms) includes a carboxy group (—COOH), which is a hydrophilic group, and a lipophilic group, which accounts for a relatively large portion of the second carboxylic acid. In most of the second carboxylic acid of the surface-modified metal compound particles, a carboxy group faces to the surface of the metal compound particles, and a lipophilic group faces outward.

According to the surface-modified metal compound particles, the metal compound particles are surface-modified with the second carboxylic acid and covered with a lipophilic group that accounts for a relatively large portion of the second carboxylic acid, and thus has good dispersibility in a nonpolar solvent such as toluene, hexane, and cyclohexane.

To simply improve the dispersibility in the nonpolar solvent, the content of the second carboxylic acid can be increased. This is because when the content of the second carboxylic acid s increased, the metal compound particles can be completely surrounded.

However, because the lipophilic group moiety of the second carboxylic acid has a relatively high molecular weight, increasing the content thereof affects the physical properties of the obtained surface-modified metal compound particles. Such a change in physical properties may not be accepted depending on the application. Specifically, for example, when the content of the second carboxylic acid is increased, the viscosity of the obtained surface-modified metal compound particles is increased.

On the other hand, when the content of the second carboxylic acid is decreased to reduce the influence on the physical properties of the obtained surface-modified metal compound particles, the dispersibility in a nonpolar solvent becomes poor. The present inventor surmises that this is because (1) the density of the lipophilic group surrounding the metal compound particles is low overall, and in addition, (2) one lipophilic group and another lipophilic group adhere to each other due to the interaction, and the surface of the metal compound particles is largely divided into a portion covered with a lipophilic moiety (a portion where multiple lipophilic groups adhere each other) and a portion uncovered.

Thus, the present inventor has found that even when the content of the second carboxylic acid is decreased, by inclusion of the first carboxylic acid in a carboxylic acid type, the good dispersibility in a nonpolar solvent can be achieved without significantly affecting the physical properties of the surface-modified metal compound particles.

The present inventor surmises that this is because, by inclusion of the first carboxylic acid in a carboxylic acid type, the first carboxylic acid enters between the lipophilic groups of second carboxylic acids and the adhesion between one lipophilic group and another lipophilic group of second carboxylic acids can be suppressed. That is, the present inventor surmises that even when the density of the lipophilic group of the second carboxylic acid is relatively low overall, the lipophilic group uniformly surrounds the metal compound particles, and thus the good dispersibility in the nonpolar solvent can be achieved. Further, the present inventor surmises that the lipophilic group of the first carboxylic acid that has entered between the lipophilic groups of second carboxylic acids contributes to the good dispersibility in a nonpolar solvent.

The fact that the first carboxylic acid is present in a carboxylic acid type is clear from Examples.

Unknown is the mechanism of the first carboxylic acid adsorbed on the metal compound particles in the carboxylic acid type contributing to solvent dispersion when the surface-modified metal compound particles are dispersed in a nonpolar solvent. It is hypothesized that the solvation of the surface-modified metal compound particles is promoted by the replacement of the first carboxylic acid in a carboxylic acid type with the solvent molecule. When acetic acid, formic acid, ethyl acetate or the like is used instead of the first carboxylic acid (methacrylic acid, acrylic acid, and propionic acid), the dispersion effect is not obtained. Thus, the first carboxylic acid presumably has physical properties including molecular weight, dipole moment, and polarizability that are suitable for this mechanism of action. Although the second carboxylic acid can be present in a carboxylic acid type, a function similar to that of the first carboxylic acid is not exhibited presumably due to incompatibility of molecular weight and the like.

Examples of the metal compound constituting metal the compound particles include a metal oxide and a metal hydroxide. Among them, a metal oxide is preferred from the viewpoint of industrial use value. In the specification, "metal oxide" and "metal hydroxide" refer to all substances whose basic component is a metal atom, and an oxygen atom or a hydroxyl group. For example, a mixture, a composite, and a solid solution thereof are also included. A substance containing impurities (for example, inevitable impurities) is also included.

The type of the metal oxide and the metal hydroxide is not particularly limited, and examples thereof include zirconia, which is commonly used as particles, hafnia, ceria, and other rare earth oxides; titania, alumina, silica, zirconium hydroxide, hafnium hydroxide, cerium hydroxide, and other rare earth hydroxides; titanium hydroxide and aluminum hydroxide; and a mixture thereof, a composite thereof, and a solid solution thereof. Among them, from the viewpoint of industrial use value, the metal constituting the metal compound particles (for example, the metal oxide and the metal hydroxide) is preferably at least one selected from the group consisting of zirconium and rare earths.

The crystalline state (crystalline or amorphous) and the type of the crystal system of the metal oxide and the metal hydroxide are not limited.

The zirconium compound usually contains hafnium as an inevitable impurity. Specifically, the zirconium compound usually contains about 1.3 to 2.5 wt % of hafnium oxide in terms of oxide calculated by the following formula (1).

$$([\text{Weight of hafnium oxide}]/([\text{Weight of zirconium oxide}]+[\text{Weight of hafnium oxide}]))\times 100(\%) \quad \text{<Formula (1)>}$$

Zirconia can contain a rare earth element, an alkali metal element, and an alkaline earth metal element as a crystal phase stabilizer. An element other than metal elements can be added to the metal oxide and the metal hydroxide for the purpose of modifying physical properties such as catalytic properties, photocatalytic properties, fluorescent properties, and light absorbing properties. Impurities other than those described above can be contained as long as they do not adversely affect the use as the surface-modified metal compound particles.

The metal compound particles are surface-modified with at least one first carboxylic acid selected from the group consisting of methacrylic acid, acrylic acid, and propionic acid, and at least one second carboxylic acid selected from the group consisting of a fatty acid having 6 to 16 carbon atoms and a monovalent carboxylic acid having at least one benzene ring and 7 to 32 carbon atoms.

"Surface-modified" includes (1) a state in which the first carboxylic acid and the second carboxylic acid are chemically or physically adsorbed on the surface of the metal compound particles, and (2) a state in which the first carboxylic acid has entered between the lipophilic groups of second carboxylic acids.

For (1) above, the first carboxylic acid and the second carboxylic acid are basically adsorbed on the surface of the metal compound particles in a carboxylate type in which a hydrogen atom of a carboxy group is dissociated as an ion.

For (2) above, the first carboxylic acid has entered between the lipophilic groups of second carboxylic acids in a carboxylic acid type in which a hydrogen atom of a carboxy group is not dissociated as an ion. In this case, the first carboxylic acid is not chemically or physically adsorbed on the surface of the metal compound particles.

As described above, the second carboxylic acid is at least one selected from the group consisting of a fatty acid having 6 to 16 carbon atoms and a monovalent carboxylic acid having at least one benzene ring and 7 to 32 carbon atoms.

In the present specification, a fatty acid having 6 to 16 carbon atoms means a monovalent carboxylic acid having 6 to 16 carbon atoms in the molecule including the carbon atom contained in a carboxy group. Specifically, for example, heptanoic acid [$CH_3(CH_2)_5COOH$] is a fatty acid having 7 carbon atoms.

The fatty acid having 6 to 16 carbon atoms can be linear or branched. The fatty acid can have a double bond in the molecule. The fatty acid can have a ring structure. The fatty acid having 6 to 16 carbon atoms is preferably a linear fatty acid having 7 to 12 carbon atoms from the viewpoint of functionality and cost, efficiency. Specifically, heptanoic acid, octanoic acid, nonanoic acid, decanoic acid, and dodecanoic acid are preferred.

In the present specification, the monovalent carboxylic acid having at least one benzene ring and 7 to 32 carbon atoms is not particularly limited, and specific examples thereof include (a) a monovalent carboxylic acid having one benzene ring and 7 to 32 carbon atoms and (b) a monovalent carboxylic acid having two benzene rings and 14 to 32 carbon atoms.

Specifically, for example, 3-phenylpropionic acid [$C_6H_5CH_2CH_2COOH$] is a monovalent carboxylic acid having one benzene ring and 9 carbon atoms.

The (a) is not particularly limited, and examples thereof include (a-1) to (a-6) below.

Benzoic acid [$C_6H_5COOH$]  (a-1)

  (a-2)

(In the formula, Ph is a benzene ring, $R^1$ is a hydrocarbon, and the total number of carbon atoms of the benzene ring and $R^1$ is in the range of 7 to 31.)

  (a-3)

(In the formula, Ph is a benzene ring, $R^2$ is a hydrocarbon, and the total number of carbon atoms of the benzene ring and $R^2$ is in the range of 7 to 31.)

  (a-4)

(In the formula, Ph is a benzene ring, $R^3$ and $R^4$ are hydrocarbons, and the total number of carbon atoms of the benzene ring, $R^3$, and $R^4$ is in the range of 8 to 31.)

  (a-5)

(In the formula, Ph is a benzene ring, Me is a methyl group, x is an integer of 1 to 4, $R^5$ and $R^6$ are hydrocarbons, and the total number of carbon atoms of the benzene ring, the methyl group, $R^5$, and $R^6$ is in the range of 9 to 31.)

(In the formula, Ph is a benzene ring, Et is an ethyl group, x is an integer of 1 to 4, $R^7$ and $R^8$ are hydrocarbons, and the total number of carbon atoms of the benzene ring, the ethyl group, $R^7$, and $R^8$ is in the range of 10 to 31.)

The hydrocarbon represented by $R^1$ to $R^8$ can be linear or branched. The hydrocarbon can have a double bond or a ring structure.

The (b) is not particularly limited, and examples thereof include (b-1) below.

  (b-1)

(In the formula, BiPh is a biphenyl structure, $R^9$ and $R^{10}$ are hydrocarbons, and the total number of carbon atoms of the biphenyl structure, $R^9$, and $R^{10}$ is in the range of 14 to 31.)

The hydrocarbon represented by $R^9$ and $R^{10}$ can be linear or branched. The hydrocarbon can have a double bond or a ring structure.

As described above, the second carboxylic acid is preferably adsorbed on the surface of the metal compound particles in a carboxylate type in which a hydrogen atom of a carboxy group is dissociated as an ion. However, all of the second carboxylic acid does not necessarily need to be adsorbed on the surface of the metal compound particles in a carboxylate type, and only at least a part, preferably a large part, needs to be adsorbed on the surface of the metal compound particles in a carboxylate type.

As described above, the first carboxylic acid is at least one selected from the group consisting of methacrylic acid, acrylic acid, and propionic acid, and at least a portion of the first carboxylic acid is a carboxylic acid type in which a hydrogen atom of a carboxy group is not dissociated as an ion.

The method for proving that the first carboxylic acid is present in a carboxylic acid type will be described later.

The surface-modified metal compound particles preferably have a median diameter of 1 to 100 nm, more preferably 1 to 50 nm, and further preferably 1 to 30 nm when dispersed in toluene. When the surface-modified metal compound particles have a median diameter of 1 to 100 nm when dispersed in toluene, the dispersibility in a nonpolar solvent is better.

The median diameter when the surface-modified metal compound particles are dispersed in toluene has been defined above because when the median diameter when dispersed in toluene as a typical nonpolar solvent is 1 to 100 nm, the surface-modified metal compound particles has good dispersibility similar to the case of toluene even in a nonpolar solvent other than toluene. Thus, the median diameter when dispersed in toluene being 1 to 100 nm is an index of good dispersibility in not only toluene but also a nonpolar solvent other than toluene, and means that the dispersibility in a nonpolar solvent other than toluene is good.

The median diameter means a particle size at which the cumulative volume frequency of the particles determined by the particle size measurement by dynamic light scattering is 50%.

The nonpolar solvent in which the surface-modified metal compound particles can be dispersed is not particularly limited. Specific examples of the nonpolar solvent include benzene, toluene, xylene, hexane, cyclohexane, petroleum ether, and mineral spirit. The petroleum ether refers to a low-boiling fraction of petroleum and does not contain ether as a chemical species.

The surface-modified metal compound particles are preferably dissolved or dispersed in toluene in an amount of 60 wt % or more, more preferably in an amount of 65 wt % or more in terms of metal oxide. Being dissolved or dispersed means that the transmittance described later is within the numerical range described later.

The suitable viscosity of the surface-modified metal compound particles varies depending on the properties and the like of the product including the surface-modified metal compound particles, and is preferably, for example, in the range of 0.1 to 10,000 mPa·s, more preferably, in the range of 21 to 1,000 mPa·s. The viscosity is determined according to the method described in Examples.

The transmittance of the surface-modified metal compound particles when dissolved or dispersed in toluene in an amount of 60 wt % in terms of oxide is preferably 1% or more at a wavelength of 400 nm and 50% or more at a wavelength of 800 nm, and more preferably 5% or more at a wavelength of 400 nm and 60% or more at a wavelength of 800 nm. When the transmittance is 1% or more at a wavelength of 400 nm and 50% or more at a wavelength of 800 nm, the surface-modified metal compound particles are considered to be suitably dispersed in a nonpolar solvent. When precipitation is observed while dissolving or dispersing the surface-modified metal compound particles in toluene, the surface-modified metal compound particles are considered not to be suitably dispersed in a nonpolar solvent even if the transmittance satisfies the numerical-range.

<Method for Producing Surface-Modified Metal Compound Particles>

The method for producing surface-modified metal compound particles according to the embodiment includes at least a step A of adding at least one second carboxylic acid selected from the group consisting of a fatty acid having 6 to 16 carbon Moms and a monovalent carboxylic acid having at least one benzene ring and 7 to 32 carbon atoms to metal compound particles having positive zeta potential and being dispersed in a water solvent; a step B of drying a product obtained through the step A; and a step C of adding at least one first carboxylic acid selected from the group consisting of methacrylic acid, acrylic acid, and propionic acid after the step B.

The method for producing surface-modified metal compound particles according to the embodiment more preferably includes at least a step A of adding at least one second carboxylic acid selected from the group consisting of a fatty acid having 6 to 16 carbon atoms and a monovalent carboxylic acid having at least one benzene ring and 7 to 32 carbon atoms to metal compound particles having positive zeta potential and being dispersed in a water solvent; a step X of adding at least one first carboxylic acid selected from the group consisting of methacrylic acid, acrylic acid, and propionic acid to the metal compound particles having positive zeta potential and being dispersed in a water solvent; a step Y of washing a product obtained through the step A and the step X with pure water; a step B of drying a product, obtained through the step A, the step X, and the step Y; and a step C of adding at least one first carboxylic acid selected from the group consisting of methacrylic acid, acrylic acid, and propionic acid after the step B.

Hereinafter, each step will be described. In each step described below, the reaction rate in each step can be appropriately changed according to manufacturing convenience by adjusting the temperature and the like in each step based on the principle of a general chemical reaction rate.

<Step A and Step X>

Metal compound particles dispersed in a water solvent are first prepared. Examples of the metal compound particles include the metal compound particles described above. As the metal compound particles dispersed in a water solvent, a sol in which metal compound particles (for example, metal oxide particles, metal hydroxide particles, or a mixture of metal oxide particles and metal hydroxide particles) are dispersed in water so that the median diameter will be 1 to 100 nm is prepared. The metal constituting the metal oxide particles and the metal hydroxide particles is not particularly limited, and examples thereof include zirconium, cerium, other rare earths, titanium, aluminum, and silicon. Specific examples of the metal compound particles dispersed in a water solvent include zirconia sol and ceria sol disclosed in Patent Document 1, Patent Document 2, and Patent Document 3.

Hereinafter, the metal compound particles dispersed in a water solvent used as a starting material are also referred to as particles to be modified.

The zeta potential of the particles to be modified is preferably positive. This is because in the subsequent surface modification treatment, by the positive zeta potential, the negatively charged carboxylate ($COO^-$) of the second carboxylic acid is attracted to the surface of the particles to be modified, and adsorbed or bound thereto, thus a lipophilic group having a high affinity for a nonpolar solvent (a fatty chain) is faced to the outside of the particles to be modified, and thereby the orientation suitable for solvation with a nonpolar solvent is formed.

As a method for adding a second carboxylic acid to the particles to be modified (step A), for example, a second carboxylic acid in the form of an alcohol solution is added to the particles to be modified (for example, sol) being stirred. The stirring time is not particularly limited, and can be, for example, 30 minutes to 2 hours.

As the alcohol used for the alcohol solution, for example, methanol, ethanol, n-propanol, isopropanol, n-butanol, benzyl alcohol and the like can be used. A solvent other than an alcohol can be used as long as the solvent is a solvent in which the second carboxylic acid can be dissolved.

The concentration of the second carboxylic acid in the step A is not particularly limited, and is preferably 1 to 30 wt %, more preferably 5 to 25 wt %. When the concentration of the second carboxylic acid in the step A is within the numerical range, the adsorption reaction to the metal compound particles can be controlled to a suitable rate.

In the step A, the molar ratio of the second carboxylic acid to the metal constituting the metal compound particles ([the number of moles of the second carboxylic acid]/[the number of moles of the metal constituting the metal compound particles]) is preferably in the range of 0.01 to 0.2, and more preferably in the range of 0.02 to 0.15. When the molar ratio in the step A is within the numerical range, the significant influence on the physical properties (for example, viscosity) of the obtained surface-modified metal compound particles can be suppressed.

In particular, when the metal constituting the metal compound particles is zirconium, in the step A, the molar ratio of the second carboxylic acid to zirconium ([the number of moles of the second carboxylic acid]/[zirconium]) is preferably in the range of 0.01 to 0.2, and more preferably in the range of 0.02 to 0.15.

After the step A, a step X is performed as needed. Specifically, in the step X, for example, a first carboxylic acid not diluted or diluted with the same alcohol or the like as described above is added to the dispersion solution obtained in the step A (particles to be modified to which the second carboxylic acid has been added) being stirred. The stirring time is not particularly limited, and can be, for example, 30 minutes to 2 hours.

The step X is a step performed when the hydrophobization of the surface of the metal compound particle by the second carboxylic acid is insufficient. When the hydrophobization of the surface of the metal compound particles in the step X is sufficient, the step X need not be performed. However, when a large amount of the second carboxylic acid is added in the step X, the physical properties of the obtained surface-modified metal compound particles are significantly affected. Thus, it is preferred that the hydrophobization be compensated without significantly affecting the physical properties of the obtained surface-modified metal compound particles by adding a small amount of the second carboxylic acid, which has a large molecular weight, and adding the first carboxylic acid, which has a small molecular weight.

The first carboxylic acid added in the step X is adsorbed on the surface of the metal compound particles in a carboxylate type in which a hydrogen atom of a carboxy group is dissociated as an ion. That is, after the step A and the step X, the first carboxylic acid and the second carboxylic acid are adsorbed in a carboxylate type with the carboxy group facing the surface of the metal compound particles.

When the step X is performed, the first carboxylic acid in a carboxylate type is present, and thus the adhesion between lipophilic groups of multiple second carboxylic acids can be suppressed.

In the step X, the molar ratio of the first carboxylic acid to the metal constituting the metal compound particles ([the number of moles of the first carboxylic acid]/[the number of moles of the metal constituting the metal compound particles]) is preferably in the range of 0.01 to 0.5, and more preferably in the range of 0.1 to 0.4. When the molar ratio in the step X is within the numerical range, the first carboxylic acid can be suitably placed between multiple second carboxylic acids adsorbed on the surface of the metal compound particles.

In particular, when the metal constituting the metal compound particles is zirconium, in the step X, the molar ratio of the second carboxylic acid to zirconium ([the number of moles of the first carboxylic acid]/[zirconium]) is preferably in the range of 0.01 to 0.5, and more preferably in the range of 0.1 to 0.4.

A paste-like precipitate product is usually obtained through the step A and the step X.

<Step Y>

Next, the product obtained through the step A and the step X is washed with pure water as needed. Specifically, for example, the product obtained through the step A and the step X is put into pure water, or pure water is added to the product to remove impurities attached to the product. Examples of the impurities include an ionic component derived from the raw material of the particles to be modified and the alcohol solvent used in the step A and the step X. However, when the impurities do not affect the obtained surface-modified metal compound particles and the products including the surface-modified metal compound particles, the step Y need not be performed. However, removing the impurities as much as possible is usually preferred.

Through the step Y, almost all of the first carboxylic acid in a carboxylate type adsorbed on the surface of the metal compound particles is washed away.

<Step B>

Next, the product obtained through the step A, the step X, and the step Y is dried. The method for drying is not particularly limited, and filtration, heating, a combination thereof and the like can be employed.

The metal compound concentration of a product after drying, that is, the metal compound concentration of a product after the step B is preferably 80 wt % or less in terms of oxide, and more preferably 75 wt % or less in terms of oxide.

When the metal compound concentration of a product after the step B is 80 wt % or less in terms of oxide, at least a small amount of water is contained. The present inventor surmises that when the metal compound concentration of a product after the step B is controlled to 80 wt % or less in terms of oxide, water (water molecule) can be interposed between lipophilic groups of multiple second carboxylic acids. That is, the present inventor surmises that the lipophilic groups of second carboxylic acids are less likely to adhere each other. The present inventor surmises that when a first carboxylic acid is added in a state where water is interposed between the lipophilic groups of multiple second carboxylic acids, the first carboxylic acid can suitably enter between the lipophilic groups of second carboxylic acids, and the adhesion between one lipophilic group and another lipophilic group of second carboxylic acids can be suppressed.

Thus, the present inventor surmises that even when the density of the lipophilic group of the second carboxylic acid is relatively low overall, the lipophilic group uniformly surrounds the metal compound particles, and thus the good dispersibility in the nonpolar solvent can be achieved. Further, the present inventor surmises that the lipophilic group of the first carboxylic acid that has entered between the lipophilic groups of second carboxylic acids contributes to the good dispersibility in a nonpolar solvent. Although the mechanism is unproved, the fact that when the metal compound concentration of a product after the step B is 80 wt % or less, good dispersibility in a nonpolar solvent is achieved is clear from Examples.

The lower limit of the metal compound concentration of a product after the step B is not particularly limited. This is because when the metal compound concentration is low, desired surface-modified metal compound particles can be obtained by increasing the amount of the first carboxylic acid added in the subsequent step C. The lower limit of the metal compound concentration can be, for example, 50 wt % or more, or 60 wt % or more in terms of oxide, from the viewpoint of production.

Through the above steps, a precursor powder is obtained.

<Step C>

After the step B, a first carboxylic acid is added to the precursor powder. Specifically, for example, the first carboxylic acid itself not diluted with a solvent or the like is directly added to the precursor powder, and the mixture is mixed. The method for mixing is not particularly limited, and examples thereof include kneading. Thereby, water (water molecules)) interposed between the lipophilic groups of multiple second carboxylic acids is, for example, replaced by the first carboxylic acid, and the first carboxylic acid enters between the lipophilic groups of second carboxylic acids. Thus, the adhesion between one lipophilic group and another lipophilic group of second carboxylic acids can be suppressed. Further, the lipophilic group of the first carboxylic acid that has entered between the lipophilic groups of second carboxylic acids contributes to the good dispersibility in a nonpolar solvent.

The first carboxylic acid added in the step C enters between the lipophilic groups of second carboxylic acids in a carboxylic acid type in which a hydrogen atom of a carboxy group is not dissociated as an ion. That is, after the step C, the first carboxylic acid is present between the lipophilic groups of second carboxylic acids in a carboxylic acid type. Thus, even when the density of the lipophilic group of the second carboxylic acid is relatively low overall, the lipophilic group uniformly surrounds the metal compound particles, and thus the good dispersibility in the nonpolar solvent can be achieved. Further, the lipophilic group of the first carboxylic acid that has entered between the lipophilic groups of second carboxylic acids contributes to the good dispersibility in a nonpolar solvent.

In the step C, the molar ratio of the first carboxylic acid to the metal constituting the metal compound particles ([the number of moles of the first carboxylic acid]/[the number of moles of the metal constituting the metal compound particles]) is preferably in the range of 0.01 to 0.5, and more preferably in the range of 0.1 to 0.4. When the molar ratio in the step C is within the numerical range, the first carboxylic acid can be suitably placed between the lipophilic groups of second carboxylic acids.

In particular, when the metal constituting the metal compound particles is zirconium, in the step C, the molar ratio of the first carboxylic acid to zirconium ([the number of moles of the first carboxylic acid]/[zirconium]) is preferably in the range of 0.01 to 0.5, and more preferably in the range of 0.1 to 0.4.

After the step C, drying can be performed as needed.

Through the steps, powdery surface-modified metal compound particles in a powder form are usually obtained.

The method for producing surface-modified metal compound particles according to the present embodiment has been described above.

Finally, a method for providing that a first carboxylic acid is present in a carboxylic acid type in the surface-modified metal compound particles according to the present embodiment will be described.

The FIGURE is an infrared absorption spectrum for explaining a method for proving that a first carboxylic acid is present in a carboxylic acid type in surface-modified metal compound particles.

In the FIGURE, a is an example of an infrared absorption spectrum of a precursor powder (after drying) after the step B and before the step C. b is an example of an infrared absorption spectrum of the surface-modified metal compound particles obtained after the step C. c is an example of an infrared absorption spectrum of a powder obtained by washing the obtained surface-modified metal compound particles with pure water. a is an infrared absorption spectrum of the surface-modified zirconia particles according to Comparative Example 1 described below, b is an infrared absorption spectrum of the surface-modified zirconia particles according to Example 1 described below, and c is an infrared absorption spectrum of a powder obtained by washing the surface-modified zirconia particles according to Example 1 with pure water.

In the FIGURE, the base lines are aligned so that the spectra can be easily compared.

The spectrum a is first compared with the state after the step B.

As described above, after the step B, almost all of the first carboxylic acid in a carboxylate type adsorbed on the surface of the metal compound particles is washed away. Thus, after the step B, the metal compound particles are in a state where only the second carboxylic acid in a carboxylate type is adsorbed on the surface as a carboxylic acid. The spectrum a in the FIGURE is a spectrum in this state, that is, a state where only the second carboxylic acid in a carboxylate type is adsorbed on the surface of the metal compound particles.

In the spectrum a, the peak attributed to C=O stretching vibration of COOH (hereinafter, also referred to as "1700 $cm^{-1}$ peak") is not present in the area of 1680 to 1720 $cm^{-1}$, and the peak attributed to the asymmetric stretching vibration of COO⁻ (hereinafter, also referred to as 1560 $cm^{-1}$ peak) is present in the area of 1540 to 1580 $cm^{-1}$. This means that a carboxylic acid in a carboxylic acid type is not present, and only a carboxylic acid in a carboxylate type is present.

That is, the spectrum a is consistent with the fact that the second carboxylic acid after the step B is not present in a carboxylic acid type, but is present in a carboxylate type.

Next, the spectrum b is compared with the state after the step C.

As described above, the step C is a step of adding a first carboxylic acid after the step B. Thus, the state after the step C is a state where the first carboxylic acid has been added to the state after the step B. As described above, after the step C, at least a portion of the first carboxylic acid is present in a carboxylic acid type in which a hydrogen atom of a carboxy group is not dissociated as an ion.

The spectrum b in the FIGURE is a spectrum in this state, that is, a state where the second carboxylic acid in a carboxylate type is adsorbed on the surface of the metal compound particles, and at least a portion of the first carboxylic acid is present in a carboxylic acid type.

In the spectrum b, 1720 $cm^{-1}$ peak is present. Further, 1560 $cm^{-1}$ peak is larger than that of the spectrum a.

This means that at least a portion of the first carboxylic acid added is present in a carboxylic acid type, and the remaining first carboxylic acid is present in a carboxylate type.

That is, the spectrum b is consistent with the state after the step C, that is, the fact that in the surface-modified metal compound particles according to the present embodiment, at least a portion of the first carboxylic acid is present in a carboxylic acid type.

Next, the spectrum c is compared with the state after washing of the surface-modified metal compound particles with pure water.

When the surface-modified metal compound particles are washed with sufficient pure water, both the first carboxylic acid in a carboxylate type adsorbed on the surface of the metal compound particles and the first carboxylic acid in a carboxylic acid type interposed between the lipophilic groups of multiple second carboxylic acids are eluted.

The spectrum c in the FIGURE is a spectrum in this state, that is, a state where both the first carboxylic acid in a carboxylate type and the first carboxylic acid in a carboxylic acid type are eluted and, and only the second carboxylic acid in a carboxylate type is adsorbed on the surface of the metal compound particles.

The spectrum c is almost the same as the spectrum a. This means a state where both the first carboxylic acid in a carboxylate type and the first carboxylic acid in a carboxylic acid type are eluted, and only the second carboxylic acid in a carboxylate type is adsorbed on the surface of the metal compound particles as in spectrum a.

As described above, comparison between the infrared absorption spectra in each step of the production step of the surface-modified metal compound particles proves that in the obtained surface-modified metal compound particles, at least a portion of the first carboxylic acid modifying the surface of the metal compound particles is a carboxylic acid type in which a hydrogen atom of a carboxy group is not dissociated as an ion.

Comparison between the infrared absorption spectrum of the obtained surface-modified metal compound particles and the infrared absorption spectrum after washing of the surface-modified metal compound particles with sufficient pure water proves whether the first carboxyl is acid in a carboxylic acid type is present on the surface-modified metal compound particles.

EXAMPLES

Hereinafter, suitable Examples of the present invention will be illustratively described in detail. However, the materials, compounding amounts and the like described in the Examples are not intended to limit the scope of the present invention only to them unless otherwise limited. Hereinafter, wt % will be simply described as %. The surface-modified zirconia particles obtained in Examples and Comparative Examples contain 1.3 to 2.5 wt % of hafnium oxide based on zirconium oxide as inevitable impurities (calculated by the following formula (1)).

([Weight of hafnium oxide]/([Weight of zirconium oxide]+[Weight of hafnium oxide]))×100(%)   <Formula (1)>

The reagents used in Examples will be described below. Hereinafter, wt % will be simply described as %.

<Reagent>
heptanoic acid (Tokyo Chemical Industry Co., Ltd.)
decanoic acid (Tokyo Chemical Industry Co., Ltd.)
dodecanoic acid (Tokyo Chemical Industry Co., Ltd.)
3-phenylpropionic acid (Tokyo Chemical industry Co., Ltd.)
pentanoic acid (Tokyo Chemical Industry Co., Ltd.)
12-hydroxystearic acid (Tokyo Chemical industry Co., Ltd.)
n-butanol (Sigma-Aldrich Japan, first grade)
methacrylic acid (Tokyo Chemical Industry Co., Ltd.)
acrylic acid (Sigma-Aldrich Japan, first grade)
propionic acid (Sigma-Aldrich Japan, first grade)
88% formic acid (Kishida Chemical Co., LTD., special grade)
glacial acetic acid (Sigma-Aldrich Japan, first grade)
toluene (Sigma-Aldrich Japan, first grade)
anhydrous citric acid (Kishida Chemical Co., LTD., special grade)
25% ammonia water (Sigma-Aldrich Japan, special grade)

The instruments used for analysis (measurement) and the measurement conditions are shown below.

<Zeta Potential Measurement>
instrument: Zeta sizer Nano ZS (Malvern)
Measurement condition:
Oxide concentration: 30%
Material:
  $ZrO_2$ (zirconia sol)
    RI: 2.17
    Absorption: 0.01
  $CeO_2$ (ceria sol)
    RI: 2.15
    Absorption: 0.01
Dispersant: Water
Temperature: 25° C.
Cell: DTS1060C
Measurement duration: Automatic (10 to 100 runs)
F (Ka) selection:
Model: Smoluchowski
Automatic attenuation selection: Yes
Automatic voltage selection: Yes
Analysis model: Auto mode <pH Measurement>
instrument: pH meter D-51 (manufactured by HORIBA, Ltd.) GRT composite electrode 9681S-10D (manufactured by HORIBA, Ltd.)
Measurement condition:
$ZrO_2$ concentration: 30%
Temperature: 20 to 25° C.
Measured under stirring.

<Measurement of Metal Oxide Concentration>
instrument:
Electric furnace: NHK-170 (NITTO KAGAKU CO., Ltd)
Crucible: C1 (NIKKATO CORPORATION)
Measurement condition:
The sample (1 g) was weighed into a crucible, and the weight of the sample after being burned at 1,000° C. for 1 hour was taken as the weight of metal oxide. The weight was measured up to 1/10,000 g using a precision balance.

PRODUCTION OF SURFACE-MODIFIED METAL COMPOUND PARTICLES ACCORDING TO EXAMPLES AND COMPARATIVE EXAMPLES

Example 1

First, a zirconia sol as particles to be modified (metal compound particles dispersed in a water solvent) was obtained by the following procedures.

Pure water was added to 886.7 g of an aqueous zirconium oxychloride solution (containing 180.0 g of Zr in terms of $ZrO_2$) to be 1000 g. On the other hand, pure water was added to 747.9 g of an aqueous sodium hydroxide solution (containing 187.0 g of NaOH as 100% NaOH, to be 1400 g, and heated to 90° C. Next, the prepared aqueous zirconium oxychloride solution was added to the aqueous sodium hydroxide solution heated at 90° C., and then the mixture was cooled to room temperature (25° C.). In this time, the solution had a pH of 13.7. The solution was filtered, washed with 5000 g of pure water to remove impurities in the obtained zirconium hydroxide, and 651.7 g of wet cake was obtained. The wet cake (538.8 g) was weighed and charged in a beaker, and pure water was added thereto to be 1000 g. The mixture was stirred for 10 minutes to disperse the zirconium hydroxide homogeneously. Then, 60.35 g of 61% nitric acid was added as a deflocculant, the mixture was heated to 100° C., and stirred and kept for 72 hours to obtain a zirconia sol.

It was found that the resulting solution was transparent and light blue in color and changed to the zirconia sol completely. Then, the solution was cooled to room temperature, ultrafiltered through a membrane filter, and washed with 500 g of pure water twice, and pure water was added thereto to obtain 500.0 g of the zirconia sol. The resulting zirconia sol had a pH of 3.3, a $ZrO_2$ concentration of 30%, and positive zeta potential.

One hundred and fifty grams of the sol was stirred. To the sol was added 23 g of a solution of decanoic acid (linear fatty acid having 10 carbon atoms) in n-butanol (concentration: 20%) (molar ratio [decanoic acid]/[Zr]=0.073), and the mixture was stirred for 30 minutes (corresponding to the step A).

Next, while stirring, 4 g of methacrylic acid (molar ratio [methacrylic acid]/[Zr]=0.13) was added, and the mixture was stirred for 30 minutes (corresponding to the step X) When the stirring was stopped and the mixture was left to stand, a transparent supernatant and a paste-like precipitate were obtained.

The precipitate was added dropwise to 1 L of pure water (ion-exchanged water) under stirring to obtain a powdery precipitate. The powdery precipitate was filtered with a Nutsche funnel, and washed by passing 1 L of pure water (corresponding to the step Y).

Next, dehydration and drying were performed to obtain a precursor powder (corresponding to the step B). At this time, the precursor powder was dried to have $ZrO_2$ concentration: 70% as a metal compound concentration.

Next, methacrylic acid in an amount corresponding to the molar ratio [methacrylic acid]/[Zr]=0.13 was added to the precursor powder, and the mixture was mixed thoroughly (corresponding to the step C). Then, the resulting product was dried in a dryer at 80° C. for 1 hour to obtain surface-modified zirconia particles.

Example 2

Surface-modified zirconia particles were obtained in the same manner as in Example 1 except that acrylic acid was added to the precursor powder in an amount corresponding to the molar ratio [acrylic acid]/[Zr]=0.13.

Example 3

Surface-modified zirconia particles were obtained in the same manner as in Example 1 except that propionic acid was added to the precursor powder in an amount corresponding to the molar ratio [propionic acid]/[Zr]=0.13.

Example 4

Surface-modified zirconia particles were obtained in the same manner as in Example 1 except that instead of a solution of decanoic acid in n-butanol (concentration: 20%), 28 g a solution of heptanoic acid (linear fatty acid having 7 carbon atoms) in n-butanol (concentration: 20%) (molar ratio [heptanoic acid]/[Zr]=0.12) was added.

Example 5

Surface-modified zirconia particles were obtained in the same manner as in Example 1 except that instead of a solution of decanoic acid in n-butanol (concentration: 20%), 25 g a solution of dodecanoic acid (linear fatty acid having 12 carbon atoms) in n-butanol (concentration: 20%) (molar ratio [dodecanoic acid]/[Zr]=0.068) was added.

Example 6

Surface-modified zirconia particles were obtained in the same manner as in Example 1 except that instead of a solution of decanoic acid in n-butanol (concentration: 20%), 30 g of a solution of 3-phenylpropionic acid in n-butanol (concentration: 15%) (molar ratio [3-phenylpropionic acid]/[Zr]=0.082) was added.

Example 7

First, a ceria sol as particles to be modified was obtained by the following procedures.

Two thousand grams of an aqueous solution containing ceric nitrate (containing 120 g of Ce in terms of $CeO_2$, $CeO_2$ concentration of 6 wt %; pH of 1 or less) was stirred under reflux and kept at 100° C. for 24 hours. Then, the aqueous solution was left to stand at an ambient temperature of 20 to 25° C. for overnight, the supernatant was removed by decantation to leave a precipitate (ceria sol precursor), and then ceric nitrate and pure water were added thereto to be 2,000 g (without considering the presence of the precipitate, containing 120 g of Ce in terms of $CeO_2$, $CeO_2$ concentration of 6 wt %, and pH of 1 or less). The aqueous solution containing ceric nitrate with the precipitate was kept at 1,000° C. for 24 hours while stirring under reflux again. Then, the aqueous solution was left to stand at an ambient temperature of 20 to 25° C. for overnight, the supernatant was removed by decantation to leave a precipitate, and then ceric nitrate and pure water were added thereto to be 2,000 g (without considering the presence of the precipitate, containing 120 g of Ce as $CeO_2$, $CeO_2$ concentration of 6 wt %, and pH of 1 or less). The aqueous solution containing ceric nitrate with the precipitate was kept at 100° C. for 24 hours while stirring under reflux again. Then, the aqueous solution was left to stand at an ambient temperature of 20 to 25° C. overnight, and then the supernatant was removed by decantation and filtered. A ceria sol was obtained by adding 533 ml of pure water to 188 g (wet) of the resulting precipitate.

Next, the ceria sol was purified and concentrated by ultrafiltration to obtain a ceria sol (pH 3.1, $CeO_2$ concentration: 30%, zeta potential: positive).

One hundred and fifty grams of the sol was stirred. To the sol was added 23 g of a solution of decanoic acid (linear fatty acid having 10 carbon atoms) in n-butanol (concentration: 20%) (molar ratio [decanoic acid]/[Ce]=0.073), and the mixture was stirred for 30 minutes (corresponding to the step A).

Next, while stirring, 4 g of methacrylic acid (molar ratio [methacrylic acid]/[Ce]=0.13) was added, and the mixture was stirred for 30 minutes (corresponding to the step X) When the stirring was stopped and the mixture was left to stand, a transparent supernatant and a paste-like precipitate were obtained.

The precipitate was added dropwise to 1 L of pure water (ion-exchanged water) under stirring to obtain a powdery precipitate. The powdery precipitate was filtered with a Nutsche funnel, and washed by passing 1 L of pure water (corresponding to the step Y).

Next, dehydration and drying were performed to obtain a precursor powder (corresponding to the step B). At this time, the precursor powder was dried to have $CeO_2$ concentration: 70% as a metal compound concentration.

Next, methacrylic acid in an amount corresponding to the molar ratio [methacrylic acid]/[Ce]=0.13 was added to the precursor powder, and the mixture was mixed thoroughly (corresponding to the step C). Then, the resulting product was dried in a dryer at 80° C. for 1 hour to obtain surface-modified zirconia particles.

Comparative Example 1

The precursor powder obtained in Example 1 was dried in a dryer at 80° C. for 1 hour to obtain surface-modified zirconia particles.

Comparative Example 2

Surface-modified zirconia particles were obtained in the same manner as in Example 1 except that instead of a solution of decanoic acid in n-butanol (concentration: 20%), 24 g of a solution of pentanoic acid (linear fatty acid having 5 carbon atoms) in n-butanol (concentration: 20%) (molar ratio [pentanoic acid]/[Zr]=0.13) was added.

Comparative Example 3

Surface-modified zirconia particles were obtained in the same manner as in Example 1 except that instead of a solution of decanoic acid in n-butanol (concentration: 20%), 25 g of a solution of 12-hydroxystearic acid (linear fatty acid having 18 carbon atoms) in n-butanol (concentration: 12%) (molar ratio [12-hydroxystearic acid]/[Zr]=0.027) was added.

Comparative Example 4

Surface-modified zirconia particles were obtained in the same manner as in Example 1 except that glacial acetic acid was added to the precursor powder in an amount corresponding to the molar ratio [acetic acid]/[Zr]=0.15.

Comparative Example 5

Surface-modified zirconia particles were obtained in the same manner as in Example 1 except that 88% formic acid was added to the precursor powder in an amount corresponding to the molar ratio [formic acid]/[Zr]=0.18.

Comparative Example 6

Surface-modified zirconia particles were obtained in the same manner as in Example 1 except that instead of a solution of decanoic acid in n-butanol (concentration: 20%), 25 g of a solution of methacrylic acid in n-butanol (concentration: 15%) (molar ratio [methacrylic acid]/[Zr]=0.13) was added, and the mixture was stirred for 30 minutes.

Comparative Example 7

To a zirconia sol obtained according to the method described in Example 1 of Patent Document 1 ($ZrO_2$: 30%, pH 3.3, zeta potential: positive), anhydrous citric acid was added in an amount corresponding to the molar ratio [acetic acid]/[Zr]=0.3, and then ammonia water was added to adjust the pH to 9.0. Further, the mixture was purified and concentrated by ultrafiltration to obtain a zirconia sol ($ZrO_2$: 30%, pET 7.8, zeta potential: negative).

Although a precursor powder was tried to be produced in the same manner as in Example 1 except that 150 g of the sol (zeta potential: negative) was used as the starting material, the reaction between the carboxylic acid and the sol did not proceed sufficiently, and the precursor powder was not obtained.

<Measurement of Infrared Absorption Spectrum>

The infrared absorption spectra of the surface-modified metal compound particles obtained in Examples 1 to 7 and the surface-modified metal compound particles obtained in Comparative Examples 1 to 6 were measured using the following instrument and measurement conditions.

As a result, in Examples 1 to 7, the peak attributed to C=O stretching vibration of COOH was observed around 1700 $cm^{-1}$. The peak attributed to the asymmetric stretching vibration of $COO^-$ was observed around 1560 $cm^{-1}$.

On the other hand, in Comparative Examples 1 to 6, no peak attributed to C=O stretching vibration of COOH was observed around 1700 $cm^{-1}$.

<Infrared Absorption Spectrum Measurement Instrument and Measurement Condition>

Instrument: Fourier transform infrared spectrophotometer, FT/IR-620 (manufactured by JASCO Corporation)

Measurement condition:
Method: ATR method (ATE-ONE unit is used)
Number of accumulation: 64
Disassembly: 4 $cm^{-1}$
Sample: % T
Background: Single
Interferometer:
  Sensitivity: Auto
  Aperture diameter: 7.1 mm
  Interferometer speed: Auto
  Filter: Auto
Apotization function: cosine
Zero filling: On
Detector: TGS The infrared absorption spectrum of Example 1 is shown in the FIGURE as spectrum b, and the infrared absorption spectrum of Comparative Example 1 is shown in the FIGURE as spectrum a.

In the spectrum b of Example 1, the peak attributed to C=O stretching vibration of COOH was observed around 1700 $cm^{-1}$. In the spectrum, the peak attributed to the asymmetric stretching vibration of $COO^-$ was observed around 1560 $cm^{-1}$.

On the other hand, in the spectrum a of Comparative Example 1, the peak attributed to C=O stretching vibration of COOH was not observed around 1700 $cm^{-1}$, and the peak attributed to the asymmetric stretching vibration of $COO^-$ was observed around 1560 $cm^{-1}$. However, the height of the peak at 1560 $cm^{-1}$ was lower than that of the spectrum a.

The comparison between Example 1 and Comparative Example 1 confirmed that the carboxylic acid in a carboxylic acid type was not present before the step B, and the carboxylic acid in a carboxylic acid type was present after the step B. It was also confirmed that the amount of the carboxylic acid in a carboxylate type is increased after the step B compared to that before the step B.

The step B is a step of adding a first carboxylic acid. Thus, this change depends only on the increase of the first carboxylic acid. Thus, it is confirmed that after the step B, at least a portion of the first carboxylic acid added is present in a carboxylic acid type, and the remaining first carboxylic acid is present in a carboxylate type.

The surface-modified zirconia particles according to Example 1 were washed with pure water, and then the infrared absorption spectrum was measured using the instrument under the measurement conditions. This infrared absorption spectrum is shown in the FIGURE as spectrum c.

The spectrum c was almost the same as the spectrum a. This confirms a state where both the first carboxylic acid in a carboxylate type and the first carboxylic acid in a carboxylic acid type are eluted, and only the second carboxylic acid in a carboxylate type is adsorbed on the surface of the metal compound particles as in spectrum a.

<Measurement of Particle Size (Median Diameter)>

Examples 1 to 6

The obtained surface-modified zirconia particles were added to toluene, and stirred to obtain a sol having a $ZrO_2$ concentration of 60%. Then, the particle size (the median diameter) of the sol was measured by dynamic light scattering using the following instrument under the following measurement conditions. The particle size (the median diameter) was 9 nm in Example 1, 13 nm in Example 2, 10 nm in Example 3, 15 nm in Example 4, 10 no in Example 5, and 9 nm in Example 6.

<Particle Size (Median Diameter) Measurement Instrument and Measurement Condition>

Instrument: particle size measurement instrument, Zetasizer Nano ZS (Malvern)

Measurement condition:
Oxide concentration: 30%
Material:
  $ZrO_2$ (zirconia sol)
    RI: 2.17
    Absorption: 0.01
  $CeO_2$ (ceria sol)
    RI: 2.15
    Absorption: 0.01
Dispersant: Toluene
Temperature: 25° C.

Cell: PCS1115 (10 mm glass square cell)
Measurement Angle: 173°
Measurement duration: Automatic
Extended duration for large particles: No
Position method: Seek for optimum Position
Automatic attenuation selection: Yes
Analysis model: General purpose Example 7

The obtained surface-modified zirconia particles were added to toluene, and stirred to obtain a sol having a $CeO_2$ concentration of 50%. Then, the particle size (the median diameter) of the sol was measured by dynamic light scattering using the same instrument under the same measurement conditions as described above, and found to be 9 nm.

Comparative Examples 1 to 6

The obtained surface-modified zirconia particles were added to toluene and stirred, but a large amount of precipitate remained and the particles were not dispersed, Thus, the particle size was not measured.

Comparative Example 7

As described above, the precursor powder itself was not obtained, and thus surface-modified zirconia particles were also not obtained. Thus, the particle size was not measured.

<Measurement of Viscosity of Surface-Modified Metal Compound Particles>

The viscosity of the surface-modified metal compound particles of Example 1 was measured using the following instrument under the following measurement conditions, and was found to be 38 mPa·s.

<Viscosity Measurement Instrument and Measurement Condition>

Instrument: VIBRO VISCOMETER SV-10A (A & D)
Measurement condition:
$ZrO_2$ concentration: 60%
Dispersion medium: toluene
Temperature: 25° C.

<Evaluation of Dispersibility of Surface-Modified Metal Compound Particles (Measurement of Transmittance when Dissolved or Dispersed in Toluene)>

The transmittance of the surface-modified metal compound particles of Example 1 was measured using the following instrument under the following measurement conditions, and was found to be 25% at the wavelength of 400 nm and 72% at the wavelength of 800 nm.

<Transmittance Measurement Instrument and Measurement Condition>

Instrument: V-750 (JASCO)
Measurement condition:
$ZrO_2$ concentration: 60%
Measurement mode: % T
Bandwidth: 2 nm
Scanning speed: 200 nm/min.
Response: Fast
Data interval: 0.5 nm
Correction: baseline
Temperature: 20 to 25° C.
Cell: 10 mm quartz glass square cell

The invention claimed is:

1. Surface-modified metal compound particles comprising:
    metal compound particles that are surface-modified with at least one first carboxylic acid selected from the group consisting of methacrylic acid, acrylic acid, and propionic acid, and at least one second carboxylic acid selected from the group consisting of a fatty acid having 6 to 16 carbon atoms and a monovalent carboxylic acid having at least one benzene ring and 7 to 32 carbon atoms,
    wherein at least a portion of the first carboxylic acid is a carboxylic acid type in which a hydrogen atom of a carboxy group is not dissociated as an ion.

2. The surface-modified metal compound particles according to claim 1, wherein the second carboxylic acid is a carboxylate type in which a hydrogen atom of a carboxy group is dissociated as an ion.

3. The surface-modified metal compound particles according to claim 1, wherein a metal constituting the metal compound particles is at least one selected from the group consisting of zirconium and rare earths.

4. The surface-modified metal compound particles according to claim 1, wherein a metal compound constituting the metal compound particles is a metal oxide.

5. A method for producing the surface-modified metal compound particles according to claim 1, the method comprising:
    a step A of adding at least one second carboxylic acid selected from the group consisting of a fatty acid having 6 to 16 carbon atoms and a monovalent carboxylic acid having at least one benzene ring and 7 to 32 carbon atoms to metal compound particles having positive zeta potential and being dispersed in a water solvent;
    a step B of drying a product obtained through the step A; and
    a step C of adding at least one first carboxylic acid selected from the group consisting of methacrylic acid, acrylic acid, and propionic acid after the step B.

6. The method for producing surface-modified metal compound particles according to claim 5, wherein a metal compound concentration of a product after the step B is 80 wt % or less in terms of oxide.

* * * * *